United States Patent
Cho et al.

(10) Patent No.: US 11,051,281 B2
(45) Date of Patent: *Jun. 29, 2021

(54) METHOD AND APPARATUS FOR TRANSMITTING AND RECEIVING UPLINK CHANNEL SOUNDING REFERENCE SIGNALS IN A WIRELESS COMMUNICATION SYSTEM

(71) Applicant: Samsung Electronics Co., Ltd., Gyeonggi-do (KR)

(72) Inventors: Joon-Young Cho, Gyeonggi-do (KR); Ju-Ho Lee, Gyeonggi-do (KR); Sang-Min Ro, Seoul (KR); Aris Papasakellariou, Dallas, TX (US)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 15/991,473

(22) Filed: May 29, 2018

(65) Prior Publication Data

US 2018/0279301 A1 Sep. 27, 2018

Related U.S. Application Data

(63) Continuation of application No. 14/673,302, filed on Mar. 30, 2015, now Pat. No. 9,986,538, which is a (Continued)

(30) Foreign Application Priority Data

Apr. 27, 2007 (KR) .................. 10-2007-0041645
Jun. 11, 2007 (KR) .................. 10-2007-0056836

(51) Int. Cl.
*H04W 72/04* (2009.01)
*H04L 1/16* (2006.01)
(Continued)

(52) U.S. Cl.
CPC ....... *H04W 72/0413* (2013.01); *H04L 1/1607* (2013.01); *H04L 5/0007* (2013.01); *H04L 5/0048* (2013.01); *H04L 27/2613* (2013.01)

(58) Field of Classification Search
CPC ............ H04W 72/0413; H04L 1/1607; H04L 5/0007; H04L 5/0048; H04L 27/2613
See application file for complete search history.

(56) References Cited

U.S. PATENT DOCUMENTS 6,359,874 B1 * 3/2002 Dent ................. H04J 11/005
370/342
7,715,492 B2 5/2010 Seki
(Continued)

FOREIGN PATENT DOCUMENTS

CN 1604663 4/2005
CN 1871792 11/2006
(Continued)

OTHER PUBLICATIONS

Kawamura et al.: Layer 1/Layer 2 Control Channel Structure in Single-Carrier FDMA Based Evolved UTRA Uplink, Vehicular Technology Conference, Apr. 22-25, 2007.
(Continued)

*Primary Examiner* — Deepa Belur
(74) *Attorney, Agent, or Firm* — The Farrell Law Firm, P.C.

(57) ABSTRACT

Methods and apparatuses are provided for transmitting uplink control information by a terminal in a wireless communication system. System information associated with an uplink transmission of a reference signal is received from a base station. Uplink control information to which a length-3 orthogonal sequence or a length-4 orthogonal (Continued)

sequence is applied is transmitted in a slot of a sub-frame. The reference signal is transmitted based on the received system information.

12 Claims, 11 Drawing Sheets

Related U.S. Application Data continuation of application No. 13/665,450, filed on Oct. 31, 2012, now Pat. No. 8,995,563, which is a continuation of application No. 12/110,828, filed on Apr. 28, 2008, now Pat. No. 8,335,276.

(51) Int. Cl.
*H04L 5/00* (2006.01)
*H04L 27/26* (2006.01)

(56) References Cited

U.S. PATENT DOCUMENTS

| | | | |
|---|---|---|---|
| 8,295,776 B2 | 10/2012 | Asanuma | |
| 8,374,076 B2 | 2/2013 | Kim et al. | |
| 8,472,464 B2 | 6/2013 | Han et al. | |
| 8,509,112 B2 | 8/2013 | Vook et al. | |
| 8,831,042 B2 | 9/2014 | Kim | |
| 9,300,455 B2 | 3/2016 | Kim | |
| 9,608,786 B2 | 3/2017 | Kim | |
| 2005/0068931 A1* | 3/2005 | Cho | H04L 5/026 370/345 |
| 2005/0083943 A1 | 4/2005 | Lee et al. | |
| 2005/0195732 A1* | 9/2005 | Huh | H04L 1/1607 370/206 |
| 2005/0286460 A1 | 12/2005 | Mottier et al. | |
| 2006/0035643 A1* | 2/2006 | Vook | H04L 5/0094 455/450 |
| 2007/0058595 A1 | 3/2007 | Classon et al. | |
| 2007/0064669 A1 | 3/2007 | Classon et al. | |
| 2007/0097927 A1* | 5/2007 | Gorokhov | H04L 5/0094 370/335 |
| 2007/0183386 A1 | 8/2007 | Muharemovic | |
| 2008/0032630 A1* | 2/2008 | Kim | H04L 25/0224 455/45 |
| 2008/0298502 A1* | 12/2008 | Xu | H04L 5/0007 375/299 |
| 2008/0311942 A1* | 12/2008 | Kim | H04L 1/1854 455/509 |
| 2009/0316811 A1* | 12/2009 | Maeda | H04W 76/11 375/260 |
| 2010/0046460 A1* | 2/2010 | Kwak | H04L 1/1854 370/329 |
| 2010/0110878 A1 | 5/2010 | Frederiksen et al. | |
| 2010/0135273 A1* | 6/2010 | Kim | H04B 1/69 370/344 |
| 2010/0238975 A1* | 9/2010 | Nakao | H04J 13/0059 375/130 |
| 2010/0315962 A1 | 12/2010 | Imai et al. | |
| 2011/0268078 A1 | 11/2011 | Ahn et al. | |
| 2012/0082263 A1* | 4/2012 | Ebrahimi Tazeh Mahalleh | H04B 7/0669 375/299 |

FOREIGN PATENT DOCUMENTS

| | | | |
|---|---|---|---|
| EP | 2 696 550 | | 2/2014 |
| JP | 2006-025415 | | 1/2006 |
| JP | 2007-510390 | | 4/2007 |
| JP | 2007-329588 | | 12/2007 |
| JP | 2008-535391 | | 8/2008 |
| JP | 2010-520699 | | 6/2010 |
| KR | 20080045039 A | * | 5/2008 |
| WO | WO 2006/020483 | | 2/2006 |
| WO | WO 2006/096784 | | 9/2006 |
| WO | WO 2006/105004 | | 10/2006 |
| WO | WO 2007/051158 | | 5/2007 |
| WO | WO 2008/081857 | | 7/2008 |
| WO | WO 2008/115112 | | 9/2008 |
| WO | WO 2008/120925 | | 10/2008 |

OTHER PUBLICATIONS

Texas Instruments: Sounding Reference Signal Assignments in E-UTRA Uplink, 3GPP TSG RAN WG1#47BIS, Italy, Jan. 15-19, 2007.
Ofuji et al.: Group-Wised Reference Signal Allocation for Single Carrier FDMA Radio Access in Evolved UTRA Uplink, Vehicular Technology Conference, Apr. 22-25, 2005.
ETRI: Cyclic-Shift Hopping for Uplink Sounding Reference Signal, 3GPP TSG RAN WG1#47bis, Italy, Jan. 15-19, 2007.
NTT DoCoMo et al., "CDMA-Based Multiplexing Method for Multiple ACK/NACK and CQI in E-UTRA Uplink", 3GPP TSG RAN WG1 Meeting #48bis, R1-071649, Mar. 26, 2007.
Nokia, "Data-non-associated Control Signal Transmission with UL Data", 3GPP TSG RAN WG1 Meeting #48, R1-071000, Feb. 12, 2007.
Samsung, "UL Reference Signal Multiplexing", R1-063257, 3GPP TSG RAN WG1 Meeting #47, Nov. 6, 2006.
LG Electronics Inc., "Consideration on Control Channel Multiplexing Structure with/without Sounding RS", 3GPP TSG RAN WG1#49, R1-072358, May 7, 2007.
Texas Instruments, "Multiplexing of Distributed ("Sounding") Reference Signals for CQI Measurement and Scheduling in EUTRA Uplink", R1-062012, 3GPP TSG RAN WG1 #46, Aug. 28-Sep. 1, 2006.
Ericsson, "Uplink Reference Signals", R1-063128, TSG-RAN WG1 #47, Nov. 6-10, 2006.
Samsung, "Uplink Channel Sounding RS Structure", R1-072229, 3GPP TSG RAN WG1 Meeting #49, May 7-11, 2007.
Chinese Office Action dated Jun. 23, 2015 issued in counterpart application No. 201210511469.2, 10 pages.

* cited by examiner

METHOD AND APPARATUS FOR TRANSMITTING AND RECEIVING UPLINK CHANNEL SOUNDING REFERENCE SIGNALS IN A WIRELESS COMMUNICATION SYSTEM

PRIORITY

This application is a Continuation Application of U.S. application Ser. No. 14/673,302, which was filed in the U.S. Patent and Trademark Office (USPTO) on Mar. 30, 2015, and issued as U.S. Pat. No. 9,986,538 on May 29, 2018, which is a Continuation Application of U.S. application Ser. No. 13/665,450, which was filed in the USPTO on Oct. 31, 2012, and issued as U.S. Pat. No. 8,995,563 on Mar. 31, 2015, which is a Continuation Application of U.S. application Ser. No. 12/110,828, which was filed in the USPTO on Apr. 28, 2008, and issued as U.S. Pat. No. 8,335,276, issued on Dec. 18, 2012, which claims priority under 35 U.S.C. § 119(a) to a Korean Patent Application Serial No. 10-2007-0041645, which was filed in the Korean Intellectual Property Office on Apr. 27, 2007, and a Korean Patent Application Serial No. 10-2007-0056836, which was filed in the Korean Intellectual Property Office on Jun. 11, 2007, the content of each of which is incorporated herein by reference.

BACKGROUND OF THE INVENTION

1. Field of the Invention

The present invention relates generally to a Frequency Division Multiple Access (FDMA)-based wireless communication system, and in particular, to a method and apparatus for transmitting and receiving Channel Sounding Reference Signals (CS RS).

2. Description of the Related Art

Recently, in mobile communication systems, intensive research has been conducted on Orthogonal Frequency Division Multiple Access (OFDMA) or Single Carrier-Frequency Division Multiple Access (SC-FDMA) as a scheme suitable for high-speed data transmission in wireless channels.

Presently, the OFDM and SC-FDMA technologies are applied in the downlink and uplink of the Evolved UMTS Terrestrial Radio Access (EUTRA) standard based on Universal Mobile Telecommunication Services (UMTS) defined by the 3$^{rd}$ Generation Partnership Project (3GPP).

SC-FDMA, a technology that is based on single-carrier transmission while guaranteeing orthogonality between multiple access users like OFDM, is advantageous in that a Peak-to-Average Power Ratio (PAPR) of transmission signals is very low. Therefore, SC-FDMA, when it is applied to the mobile communication system, can bring improvement of the cell coverage due to its low PAPR, compared to the OFDM technology.

FIG. 1 illustrates a structure of a general SC-FDMA transmitter and a slot structure, in which Fast Fourier Transform (FFT) 103 and Inverse Fast Fourier Transform (IFFT) 105 are used.

Referring to FIG. 1, a difference between OFDM and SC-FDMA will be considered in terms of the transmitter structure. Aside from IFFT 105 used for multi-carrier transmission in an OFDM transmitter, FFT 103 further exists in front of the IFFT 105 in an SC-FDMA transmitter. Here, M modulation symbols 100 constitute one block, and the block is input to the FFT 103 with a size M. Each of the blocks will be referred to herein as a 'Long Block (LB)', and 7 LBs constitute one 0.5-ms slot 102.

Signals output from the FFT 103 are applied to the IFFT 105 as inputs having consecutive indexes (See 104), where the signals undergo inverse Fourier transform, and then are converted into an analog signal (See 106) before being transmitted. An input/output size N of the IFFT 105 is greater than an input/output size M of the FFT 103. The SC-FDMA transmission signal has a lower PAPR than the OFDM signal because the signal processed by means of the FFT 103 and IFFT 105 has single-carrier characteristics.

FIG. 2 illustrates exemplary resource partitioning in the frequency-time domain in a EUTRA SC-FDMA system.

Referring to FIG. 2, a system bandwidth 201 is 10 MHz, and a total of 50 Resource Units (RUs) 202 exist in the system bandwidth 201. Each RU 202 is composed of 12 subcarriers 203, can have 14 LBs 204, and is a basic scheduling unit for data transmission. The 14 LBs 204 constitute one 1-ms subframe 205.

FIG. 3 is a diagram illustrating resource allocation for transmission of a control channel and a data channel in the EUTRA uplink based on the resource partitioning structure of FIG. 2.

Referring to FIG. 3, control information, such as ACKnowledge (ACK)/Negative ACK (NACK) representative of response signals for a Hybrid Automatic Repeat reQuest (HARD) operation for downlink data and Channel Quality Indication (CQI) representative of channel state information for downlink data scheduling, is transmitted through the RUs located in both ends, i.e., RU #1 and RU #50 of the system band. Meanwhile, information such as data, Random Access CHannel (RACH) and other control channels, is transmitted through the RUs located in the middle 302 of the system band, i.e., all RUs except for RU #1 and RU #50.

Control information transmitted in the first slot 308 of RU #1 is repeatedly transmitted through RU #50 311 in the next slot by frequency hopping, thereby obtaining frequency diversity gain. Similarly, control information transmitted using the first slot 309 of RU #50 is repeatedly transmitted through RU #1 310 in the next slot by frequency hopping. Meanwhile, several control channels are transmitted in one RU after undergoing Code Domain Multiplexing (CDM).

FIG. 4 illustrates the detailed CDM structure for control channels.

Referring to FIG. 4, ACK CHannel (ACKCH) #1 and ACKCH #2 allocated to different terminals transmit their associated ACK/NACK signals using the same Zadoff-Chu (ZC) sequence at every LB. Symbols of a ZC sequence 412 applied to ACKCH #1 are transmitted in an order of $s_1$, $s_2$, . . . , $s_{12}$ at every LB, and symbols of a ZC sequence 414 applied to ACKCH #2 are transmitted in an order of $s_3$, $s_4$, . . . , $s_{12}$, $s_1$, $s_2$. That is, the ZC sequence applied to ACKCH #2 is cyclic-shifted from the ZC sequence of ACKCH #1 by 2 symbols (Δ (Delta)=2 symbols). ZC sequences having different cyclic shift values '0' 408 and Δ (Delta) 410 according to the ZC sequence characteristics having mutual orthogonality. By setting a difference between the cyclic shift values 408 and 410 to a value greater than the maximum transmission delay of a wireless transmission path, it is possible to maintain orthogonality between channels.

Corresponding ZC sequences of ACKCH #1 and ACKCH #2 are multiplied by ACK/NACK symbols $b_1$ and $b_2$ desired to be transmitted at every LB, respectively. Due to the orthogonality between the ZC sequences, even though ACKCH #1 and ACKCH #2 are transmitted at the same time in the same RU, a base station's receiver can detect the ACK/NACK symbols $b_1$ and $b_2$ of two channels without mutual interference. At LBs 405 and 406 located in the middle of a slot, Reference Signals (RSs) for channel estimation are transmitted during detection of the ACK/NACK symbols. Like the control information of ACKCH #1 and ACKCH #2, the RS is also transmitted after undergoing CDM by means of its corresponding ZC sequence. In FIG. 4, $b_1$ and $b_2$ are repeated over several LBs, in order to enable even the terminal located in the cell boundary to transmit an ACK/NACK signal of sufficient power to the base station.

According to a similar principle, even the CQI channel transmits one modulation symbol at every LB, and different CQI channels can undergo CDM using ZC sequences having different cyclic shift values.

FIG. 5 illustrates a structure where five control channels 500~504 are multiplexed in one RU for a 0.5-ms slot.

Referring to FIG. 5, there are shown two ACK Channels, ACKCH #1 500 and ACKCH #2 501, employing coherent modulation; and three control channels of Non-Coherent Signaling Control CHannels (NCCCH) #1 502, #2 503 and #3 504 for transmitting 1-bit control information using a non-coherent modulation scheme. ACKCH #1 500 and ACKCH #2 502 transmit RS signals for channel estimation at the $2^{nd}$ and $6^{th}$ LBs (hereinafter, "RS LBs") 511 and 512 (513 and 514), respectively, and transmit ACK/NACK symbols 515 at the remaining LBs (hereinafter, "control information LBs"). NCCCHs 502, 503 and 504 transmit only the control information at the $1^{st}$, $3^{rd}$, $4^{th}$, $5^{th}$, and $7^{th}$ LBs.

ACKCH #1 500 and ACKCH #2 501 apply the same cyclic shift value A (shift of ZC) 510 to ZC sequences transmitted at each LB. Therefore, the same cyclic shift value A (shift of ZC) 510 is applied between the two channels 500 and 501 even at LBs 511~514 for transmission of RS signals.

For orthogonal detection of ACK/NACK symbols $b_1$ and $b_2$ transmitted in the two channels 500 and 501, the signals multiplexed to ZC sequences of ACKCH #1 500 and ACKCH #2 501 are multiplied by sequence symbols of N-bit orthogonal sequences $S_{m,n}$ 516 (where n denotes a sequence symbol index, for n=1, N) with different indexes m in units of LBs. For instance, a Fourier sequence defined as Equation (1) can be applied as the orthogonal sequence.

$$S_{m,n} = \exp\left(j\frac{2\pi mn}{N}\right), n = 1, \ldots, N \quad (1)$$

The Fourier sequence satisfies mutual orthogonality between sequences with different indexes m, and N=5 in the structure shown in FIG. 5. Aside from the Fourier sequence, other 5-bit sequences such as ZC and Generalized Chirp-Like (GCL) sequences can also be used as the orthogonal sequence.

In the example of FIG. 5, symbols of 5-bit sequences with indexes 1 and 2 are sequentially multiplied by signals of control information LBs of ACKCH #1 and ACKCH #2, respectively. Specifically, at LB 520, each symbol of a ZC sequence applied in common to ACKCH #1 and ACKCH #2 is multiplied by an ACK/NACK symbol $b_1$ of ACKCH #1 and the first symbol $S_{1,1}$ of a Fourier sequence #1. Similarly, at LB 521, each symbol of the ZC sequence is multiplied by an ACK/NACK symbol $b_2$ of ACKCH #2 and the first symbol $S_{1,1}$ of a Fourier sequence #2.

Meanwhile, since two RS LBs 511~514 exist in one slot, 2-bit Walsh sequences with different indexes are applied to ACKCH #1 500 and ACKCH #2 501 at RS LBs 511~514. When ZC sequences with the same cyclic shift value 510 are applied to ACKCH #1 500 and ACKCH #2 501 as described above, since a length of the orthogonal sequence $S_{m,n}$ is 5, three more orthogonal sequences are available. However, as stated above, since only two LBs capable of transmitting the RS exist in one slot, there is a problem in that it is not possible to generate additional RS signals other than ACKCH #1 500 and ACKCH #2 501 when applying the same ZC sequences to the control information LBs.

SUMMARY OF THE INVENTION

An aspect of the present invention is to provide a method and apparatus for transmitting CS RS in a wireless communication system, Another aspect of the present invention is to provide a method and apparatus for multiplexing CS RS and other uplink control channels in an SC-FDMA-based wireless communication system.

Another aspect of the present invention is to provide a method and apparatus for maintaining the constant resource allocation bandwidth of CS RS regardless of the amount of resources for other uplink control channels thereby to fixedly allocate CS RS to each terminal in an SC-FDMA-based wireless communication system.

Another aspect of the present invention is to provide an ACK/NACK channel structure for multiplexing a CS RS channel and an ACK/NACK channel such that a slot where the CS RS is transmitted and a slot where the CS RS is not transmitted have the same ACK/NACK channel transmission capacity.

In accordance with an aspect of the present invention, a method is provided for transmitting uplink control information by a terminal in a wireless communication system. System information associated with an uplink transmission of a reference signal is received from a base station. Uplink control information to which a length-3 orthogonal sequence or a length-4 orthogonal sequence is applied is transmitted in a slot of a sub-frame. The reference signal is transmitted based on the received system information.

In accordance with another aspect of the present invention, a terminal is provided for transmitting uplink control information in a wireless communication system. The apparatus includes a transceiver and a controller coupled with the transceiver. The controller is configured to receive system information associated with an uplink transmission of a reference signal from a base station, and transmit uplink control information to which a length-3 orthogonal sequence or a length-4 orthogonal sequence is applied in a slot of a sub-frame. The reference is transmitted based on the received system information.

In accordance with an additional aspect of the present invention, a method is provided for receiving uplink control information by a base station in a wireless communication system. System information associated with an uplink transmission of a reference signal is transmitted. The uplink control information to which a length-3 orthogonal sequence or a length-4 orthogonal sequence is applied is received in a slot of a sub-frame from a terminal. The reference signal is received from the terminal receiving the system information. The reference signal is received based on the received system information.

In accordance with a further aspect of the present invention, a base station is provided for receiving uplink control information in a wireless communication system. The base station includes a transceiver and a controller coupled to the transceiver. The controller is configured to transmit system information associated with an uplink transmission of a reference signal, receive the uplink control information to which a length-3 orthogonal sequence or a length-4 orthogonal sequence is applied in a slot of a sub-frame from a terminal, and receive the reference signal from the terminal receiving the system information. The reference signal is received based on the received system information.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Various embodiments of the present invention will now be described in detail with reference to the annexed drawings. In the following description, descriptions of known functions and configurations incorporated herein have been omitted for clarity and conciseness. Terms used herein are defined based on functions in the present invention and may vary according to users, operators' intention, or usual practices. Therefore, the definition of the terms should be made based on contents throughout the specification.

Although a description of the present invention will be made herein with reference to an OFDM-based wireless communication system, especially to the 3GPP EUTRA standard, the present invention can be applied to other communication systems having a similar technical background and channel format with a slight modification without departing from the scope of the present invention.

Figure 11:
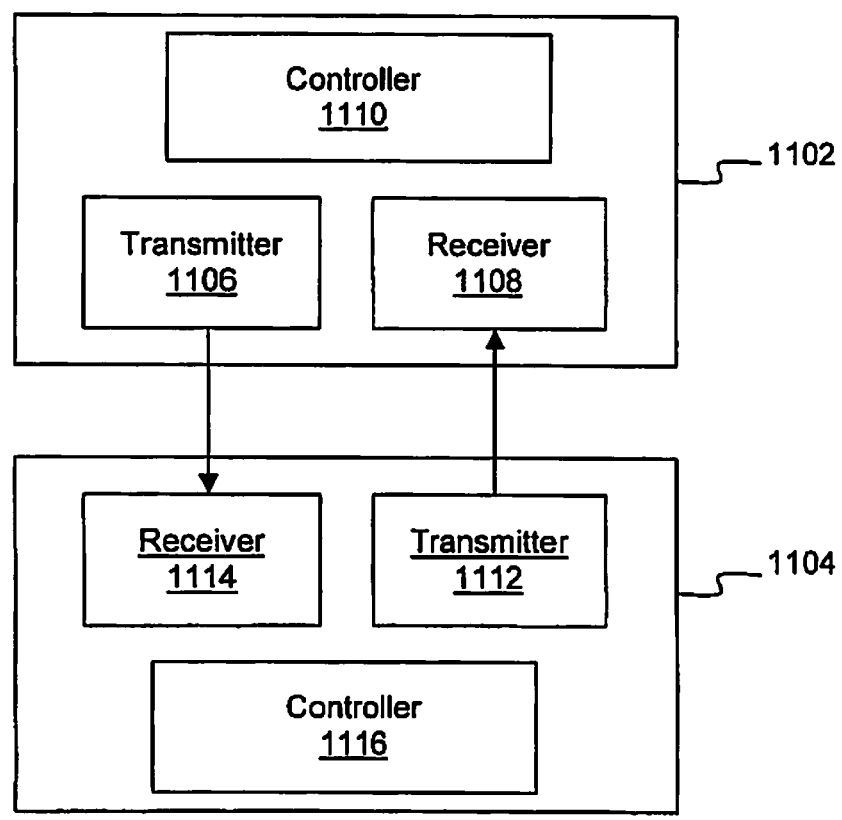
FIG. 11 is a diagram illustrating a wireless communication system, according to an embodiment of the present invention.

Referring to FIG. 11, a diagram illustrates a wireless communication system, according to an embodiment of the present invention. A terminal 1102 is in communication with a base station 1104. The terminal 1102 includes a transmitter 1106 for transmitting signals to the base station 1104, a receiver 1108 for receiving signals from the base station 1104, and a controller 1110 for controlling functions of the terminal 1102. The base station 1104 includes a transmitter 1112 for transmitting signals to the terminal 1102, a receiver 1114 for receiving signals from the terminal 1102, and a controller 1116 for controlling functions of the base station 1104.

An aspect of the present invention is to multiplex a Channel Sounding Reference Signal (CS RS) channel and an uplink control channel in a wireless communication system. A CS RS, which is a pilot signal that a base station receives from each terminal, is used by the base station in estimating a channel state from each terminal till the base station. Based on the estimation result, the base station determines a data channel of which terminal it will schedule, for every sub-frame. For a CS RS channel, each terminal can have a different transmission bandwidth and a different transmission period according to the terminal state.

Figure 1:
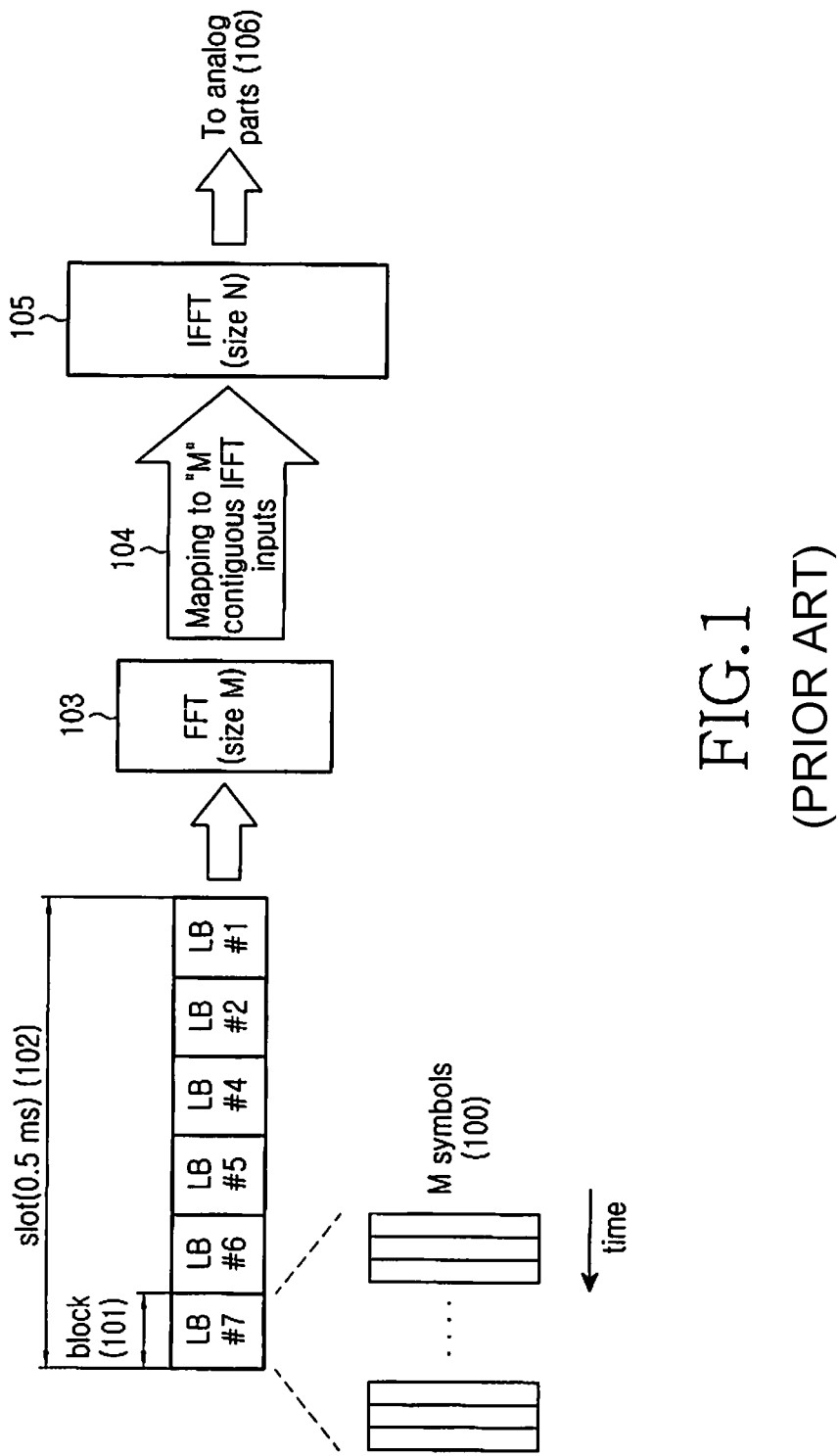
FIG. 1 illustrates a structure of a general SC-FDMA transmitter and a slot structure.
Figure 2:
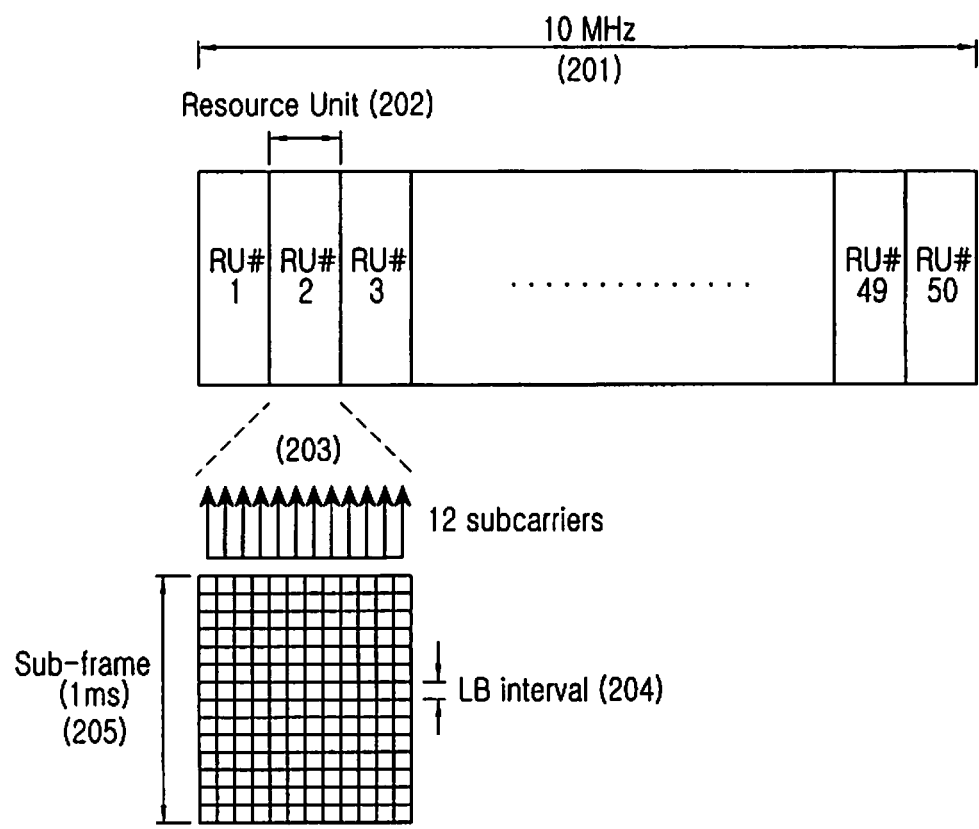
FIG. 2 illustrates exemplary resource partitioning in the frequency-time domain in a EUTRA SC-FDMA system.
Figure 3:
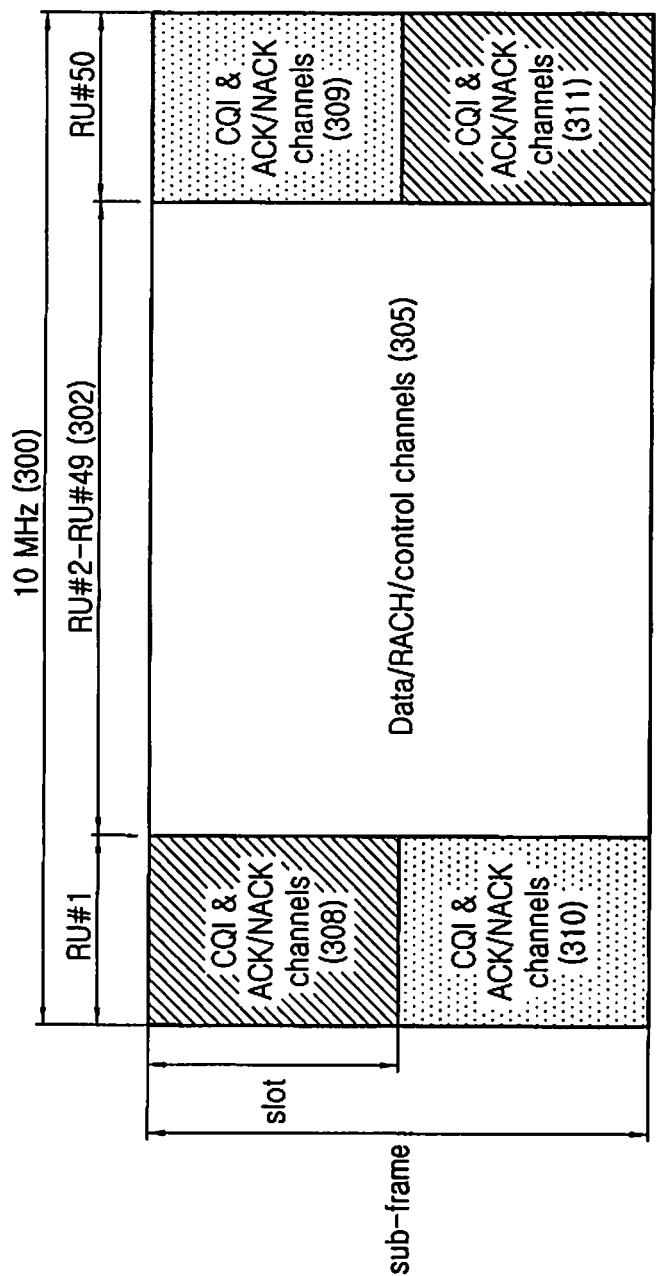
FIG. 3 is a diagram illustrating resource allocation for transmission of a control channel and a data channel in the EUTRA uplink based on the resource partitioning structure of FIG. 2.

The present invention provides a technology for transmitting a CS RS at the time completely separated from the transmission time of other uplink channels, including data and control channels, and matching a bandwidth of allocated resources to the entire uplink system bandwidth (300 in FIG. 3), thereby preventing influence on the number of control channels transmittable in control channel resources 308, 309, 310 and 311 in the uplink. In addition, the present invention differently applies a length of an orthogonal sequence applied to a control channel, i.e., an ACK/NACK channel, in a slot where the CS RS is transmitted and a slot where the CS RS is not transmitted, thereby enabling transmission of the same number of ACK/NACK channels in the two slots regardless of whether the control channel and CS RS exist in the same slot.

A detailed description will now be made of a CS RS transmission technology provided by the present invention through the following embodiments.

An embodiment of the present invention does not overlap a CS RS in RUs for transmitting an uplink control channel, and according thereto, uses one of LBs that the control channel do not use, for the CS RS transmission. In this case, an orthogonal sequence is applied to an ACK/NACK channel according to the number of LBs for ACK/NACK bit transmission, remaining after being applied to the CS RS.

Figure 6:
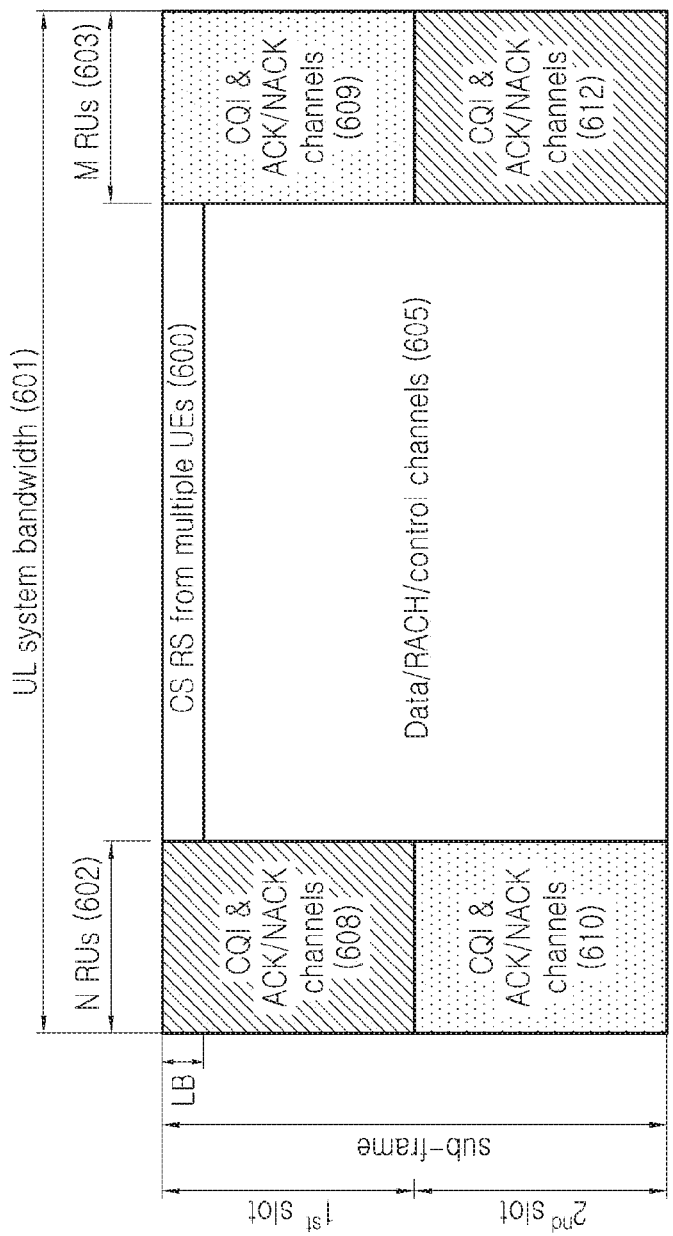
FIG. 6 illustrates typical multiplexing of a channel sounding channel and other channels.

FIG. 6 illustrates typical multiplexing of a channel sounding channel and other channels.

Referring to FIG. 6, an uplink system band 601 is composed of N first RUs 602 and M second RUs 603, all of which are used as control channel(s), and a central band between the first and second RUs 602 and 603. In EUTRA, ACK/NACK symbols are transmitted using four LBs, and RS is transmitted using three LBs in control channel slots 608, 609, 610 and 611.

As illustrated, a CS RS channel 600 can be multiplexed with other uplink channels. The CS RS channel 600 is disposed in the first LB interval of the central band to which a data channel 605 is mapped. CS RSs transmitted by several terminals undergo CDM using cyclic shifting of ZC sequences, or are multiplexed to different frequency resources.

Generally, the number of uplink RUs 602 and 603 used for control channel transmission can vary for every sub-frame according to the number of necessary control channels. In that case, in the CS RS multiplexing structure shown in FIG. 6, a transmission bandwidth of the CS RS channel 600 should change for every subframe according to the number of control channel RUs 602 and 603 in use so that a band of the CS RS channel 600 should not overlap with the band occupied by the control channels, which prevents interference from occurring between the CS RS channel 600 and the control channels.

For this reason, in order for the transmission bandwidth of the CS RS channel 600 to change, it is necessary that terminals transmitting CS RSs must continuously receive, from the base station, signaling information on a band of the CS RS channel to be applied in the corresponding subframe. In addition, it is necessary that CS RS channels of various bandwidths should be defined. In this case, multiplexing a CS RS from each terminal is complicated, causing a load of determining CS RS sequences of various lengths. Accordingly, there is a need to solve this problem.

Figure 7:
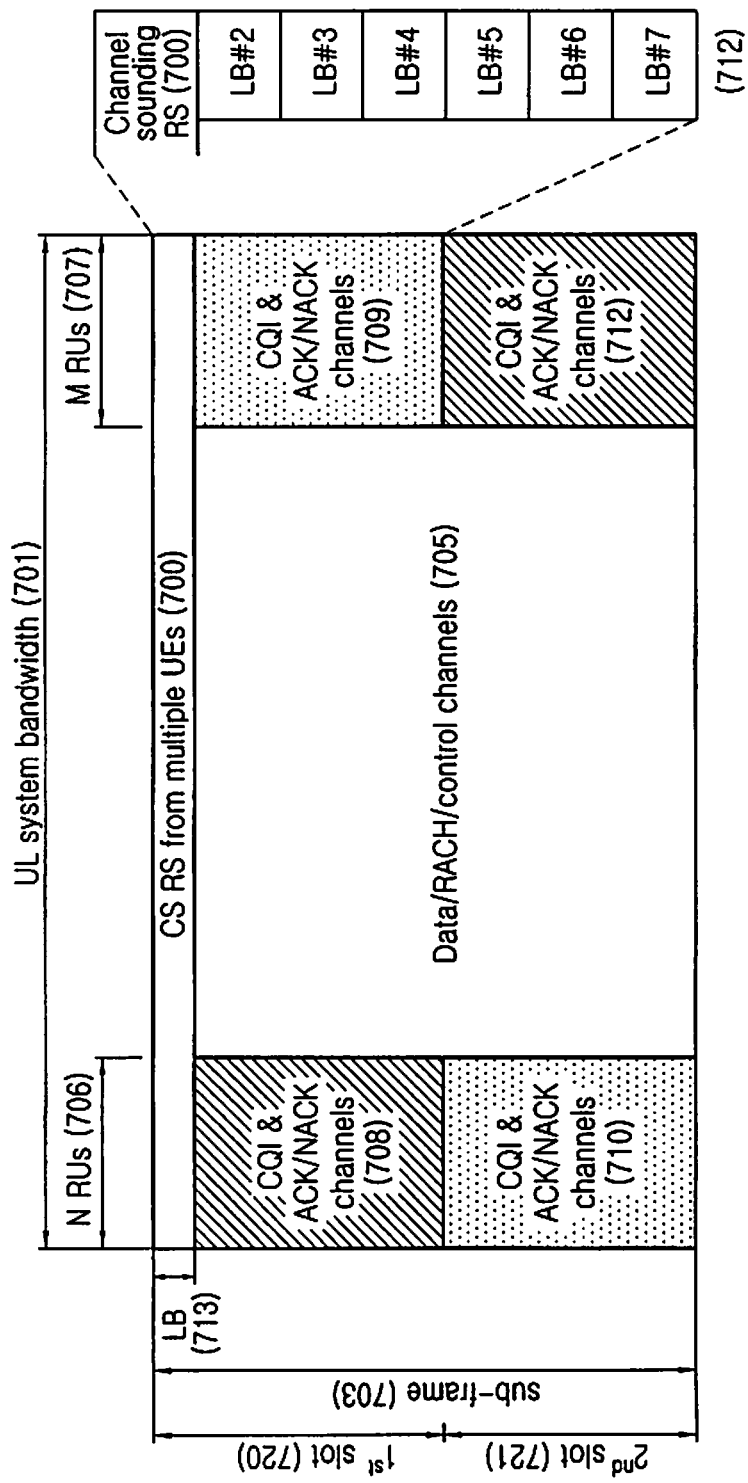
FIG. 7 illustrates multiplexing of a CS RS channel and other channels according to a preferred embodiment of the present invention.

FIG. 7 illustrates multiplexing of a CS RS channel and other channels according to a preferred embodiment of the present invention.

Referring to FIG. 7, an uplink system band 701 is composed of N first RUs 706 and M second RUs 707, all of which are used as control channel(s), and a central band 705 between the first and second RUs 706 and 707. A data channel is mapped to the central band 705. ACK/NACK symbols for an ACK/NACK channel or CQI symbols for a CQI channel are transmitted in control channel slots 708 and 709 (710 and 711) of the control channel RUs 706 and 707, respectively.

Here, in one subframe 703 composed of two slots 720 and 721, a CS RS channel 700 is allocated resources over the entire system band 701 of the uplink during the first LB 713 regardless of the number of RUs 706 and 707 used for transmission of uplink control channels. Therefore, the transmission bandwidth of the CS RS channel 700 can be maintained constant in the subframe 703 regardless of the number of RUs 706 and 707 used for transmission of control channels. Accordingly, the system indicates the band and transmission period to be used as a CS RS channel for each terminal, and each terminal periodically transmits CS RS using the indicated resources without the need to receive additional signaling from the base station.

Therefore, the present invention can satisfy the single-carrier transmission characteristic required for SC-FDMA transmission even when a terminal should simultaneously transmit CS RS and a control channel in an arbitrary subframe. In addition, the present invention differently applies a length of an orthogonal sequence applied to an ACK/NACK channel in a slot where CS RS is transmitted and a slot where CS RS is not transmitted, thereby enabling transmission of the same number of ACK/NACK channels in the two slots regardless of multiplexing of CS RS.

Among the LBs constituting the first slot 720, one LB is not used for a control channel as shown by reference numeral 712, and since uplink control channels are transmitted while undergoing frequency hopping for a 1-ms subframe as described above, it is necessary that the same number of control channels can be transmitted in the control channel slots 709 and 710. Similarly, even in the control channel slots 708 and 711, the same number of control channels should be transmitted. An uplink ACK/NACK channel structure for satisfying such requirements will be described below.

Figure 8:
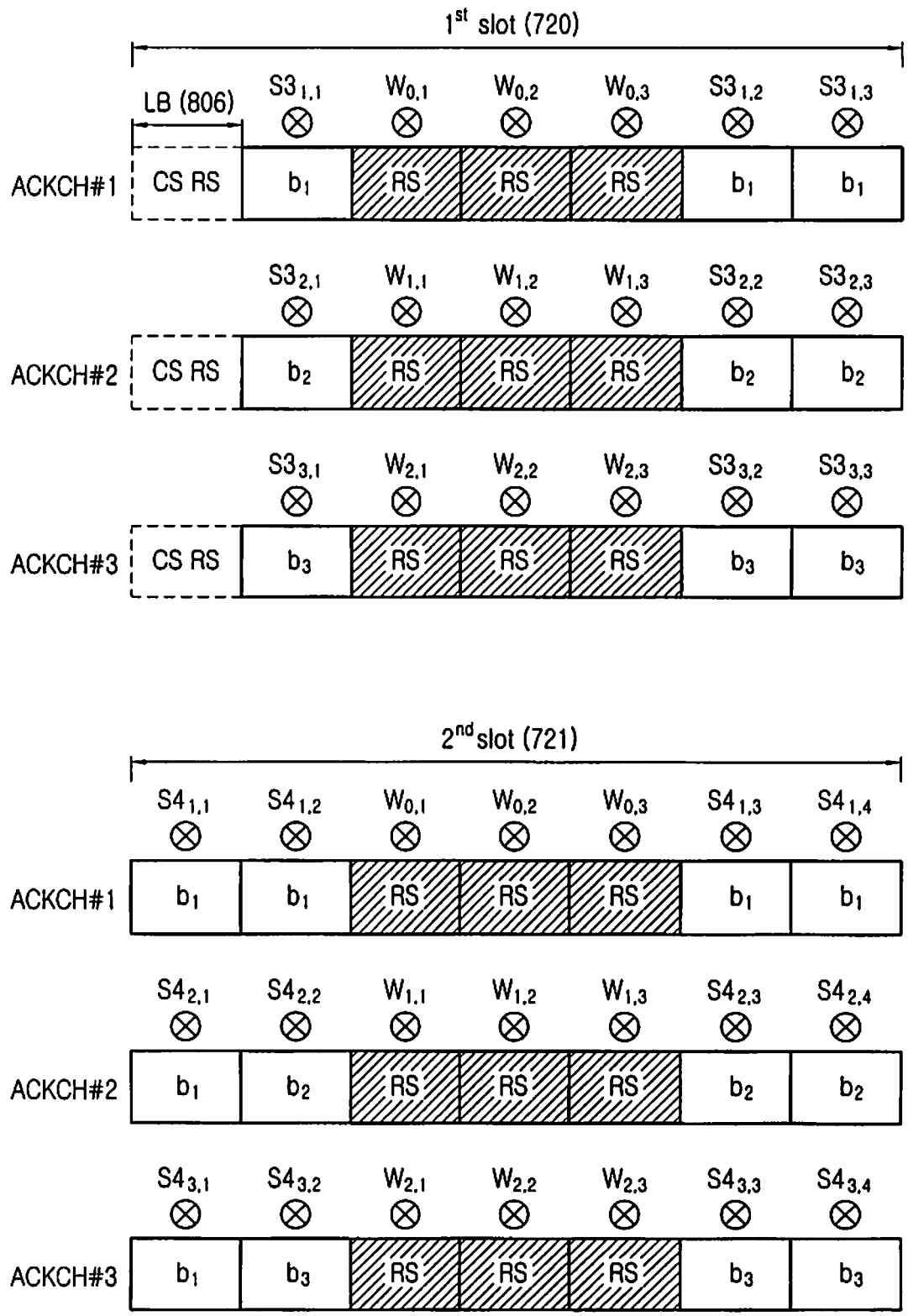
FIG. 8 illustrates an example where ACK/NACK channels using a ZC sequence, to which one same cyclic shift value is applied, are multiplexed in one LB according to an embodiment of the present invention.

FIG. 8 illustrates an example where ACK/NACK channels using a ZC sequence, to which one same cyclic shift value is applied, are multiplexed in one LB according to an embodiment of the present invention.

Referring to FIG. 8, $S3_{i,j}$ denotes a $j^{th}$ sample of a 3-bit orthogonal sequence having an $i^{th}$ index, and $S4_{i,j}$ denotes a $j^{th}$ sample of a 4-bit orthogonal sequence having an $i^{th}$ index. The orthogonal sequences $S3_{i,j}$ and $S4_{i,j}$ are used for transmission of ACKCH #i in the first slot 720 and the second slot 721, respectively.

For the first slot 720, since CS RS is transmitted at the first LB interval 806 as described in FIG. 7, a 3-bit orthogonal sequence $S3_{i,j}$ is used in the first slot in order to maintain orthogonality between ACKCH #1~3. For this purpose, a 3-bit Fourier sequence can be applied as the orthogonal sequence.

Meanwhile, a 3-bit sequence $W_{i,j}$ is used as a CS RS for channel estimation of ACKCH #i. Since the LB where the sequence $W_{i,j}$ is transmitted is not punctured by the CS RS, positions of the LB are equal in the first slot 720 and the second slot 721. When the CS RS is transmitted at an arbitrary LB in a subframe as stated above, since the LB where the CS RS is transmitted cannot be used for control channel transmission, the number of LBs for ACK/NACK symbols and LBs for RS transmission, except the LB for transmission of the CS RS, which is set to be equal in both slots.

By proposing the ACK/NACK channel structure shown in FIG. 8, the number of ACK/NACK channels that can undergo coherent transmission can be maintained at three channels regardless of the transmission of the CS RS in the corresponding subframe.

Although an index of a sequence for ACKCH #i used in the first slot 720 and the second slot 721 does not change in this embodiment, when sequence hopping is applied between slots for inter-cell interference diversity, an index of a sequence used between the two slots can change for one ACK/NACK channel, and the index change is not limited in the present invention.

Although a description of an embodiment of the present invention has been made herein for a case where a CS RS is transmitted at the first LB of the first slot in a subframe, the present invention is not limited to the position of the CS RS channel. However, by providing that the LB of an ACK/NACK symbol is punctured in the slot where the CS RS is transmitted and the number of LBs where the CS RS is transmitted is equal between two slots, the number of transmittable ACK/NACK channels can be equal in the slot where the CS RS is transmitted and the slot where the CS RS is not transmitted. An example of this case will be described with reference to FIG. 9.

Figure 9:
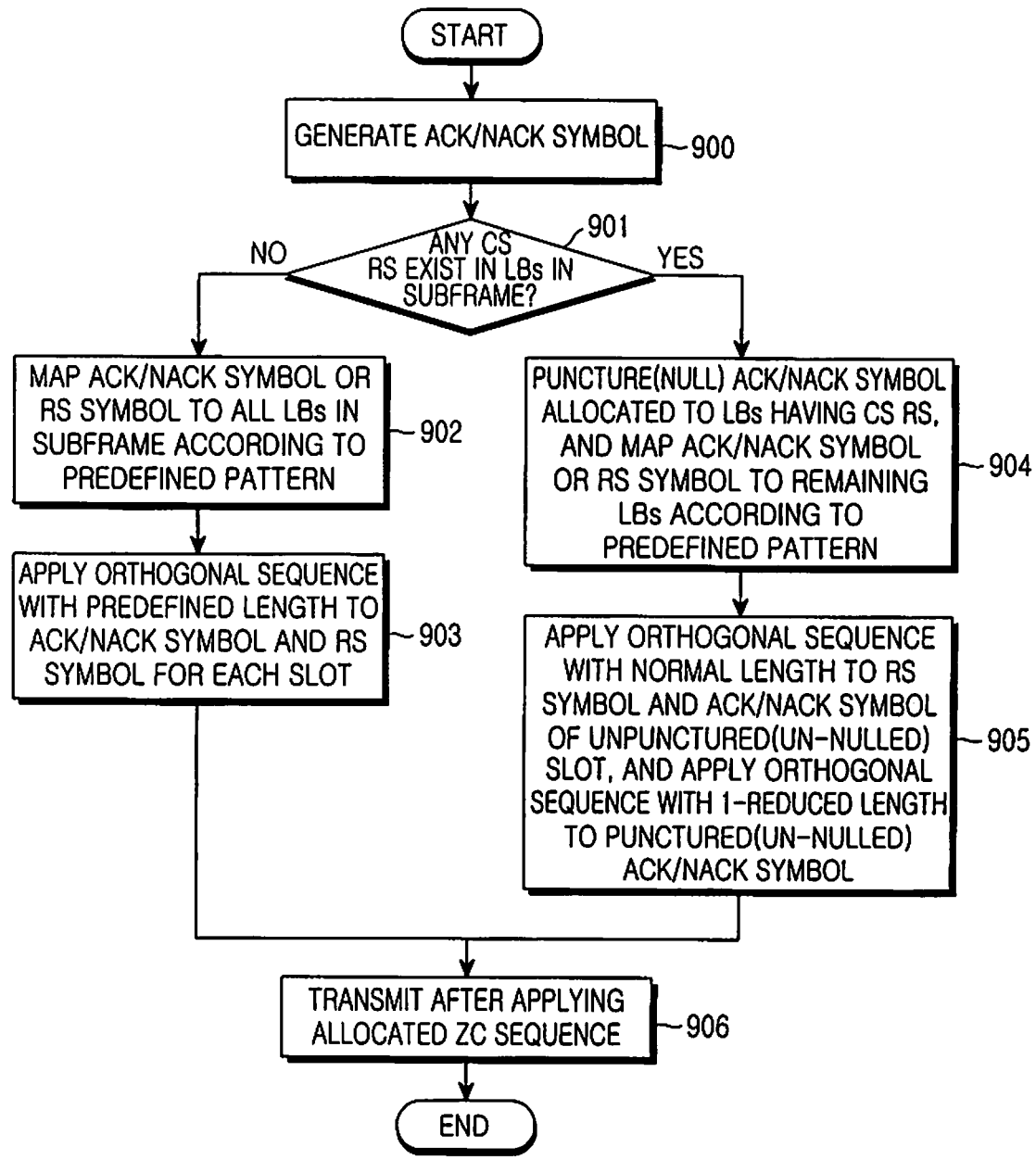
FIG. 9 is a flowchart illustrating a transmission operation of a terminal according to an embodiment of the present invention.

FIG. 9 is a flowchart illustrating a transmission operation of a terminal according to a preferred embodiment of the present invention.

Referring to FIG. 9, in step 900, a terminal generates an ACK/NACK symbol according to a success or failure in decoding of data received over a data channel in the downlink. In step 901, the terminal determines whether there are any LBs where a CS RS can be transmitted, in a subframe for transmitting the ACK/NACK symbol. The determination can be achieved from system configuration information or upper layer signaling information for uplink channels.

If it is determined in step 901 that there is no LB where the CS RS can be transmitted in the subframe for transmitting the ACK/NACK symbol, the terminal maps in step 902 the ACK/NACK symbol or RS symbols to all LBs in the subframe according to a predefined pattern. In step 903, the terminal applies an orthogonal sequence with a length predefined for each slot to the mapped ACK/NACK symbol or RS symbols, and then proceeds to step 906. For example, when four ACK/NACK symbol LBs and three RS symbol LBs exist in one slot as in the second slot 721 of FIG. 8, a 4-bit orthogonal sequence S4$_{i,j}$ can be applied to the four ACK/NACK symbol LBs and a 3-bit orthogonal sequence W$_{i,j}$ can be applied to the three RS symbol LBs as shown in FIG. 7. In this case, for a high-speed terminal, a 2-bit orthogonal sequence can be applied twice to the four ACK/NACK symbol LBs.

However, if it is determined that there is an LB where the CS RS can be transmitted in the subframe for transmitting the ACK/NACK symbol, the terminal punctures, in step 904, the ACK/NACK symbol allocated to the LB where the CS RS exists, does not map the ACK/NACK symbol allocated to the LB where the CS RS exists, and maps the ACK/NACK symbol or RS symbol to the remaining LBs in the subframe according to a predefined pattern. This process is as shown in the first slot 720 in FIG. 7. In step 905, the terminal applies, to the slot, an orthogonal sequence having a length reduced by the number of punctured symbols for the ACK/NACK symbol punctured as in the first slot 720, and applies an orthogonal sequence with a normal or a predefined length (sequence for ACK/NACK) to the ACK/NACK symbol or RS symbol of the unpunctured slot, and then proceeds to step 906, i.e., the orthogonal sequence applied in step 905 is determined according to the number of LBs remaining after being applied to the CS RS.

Figure 4:
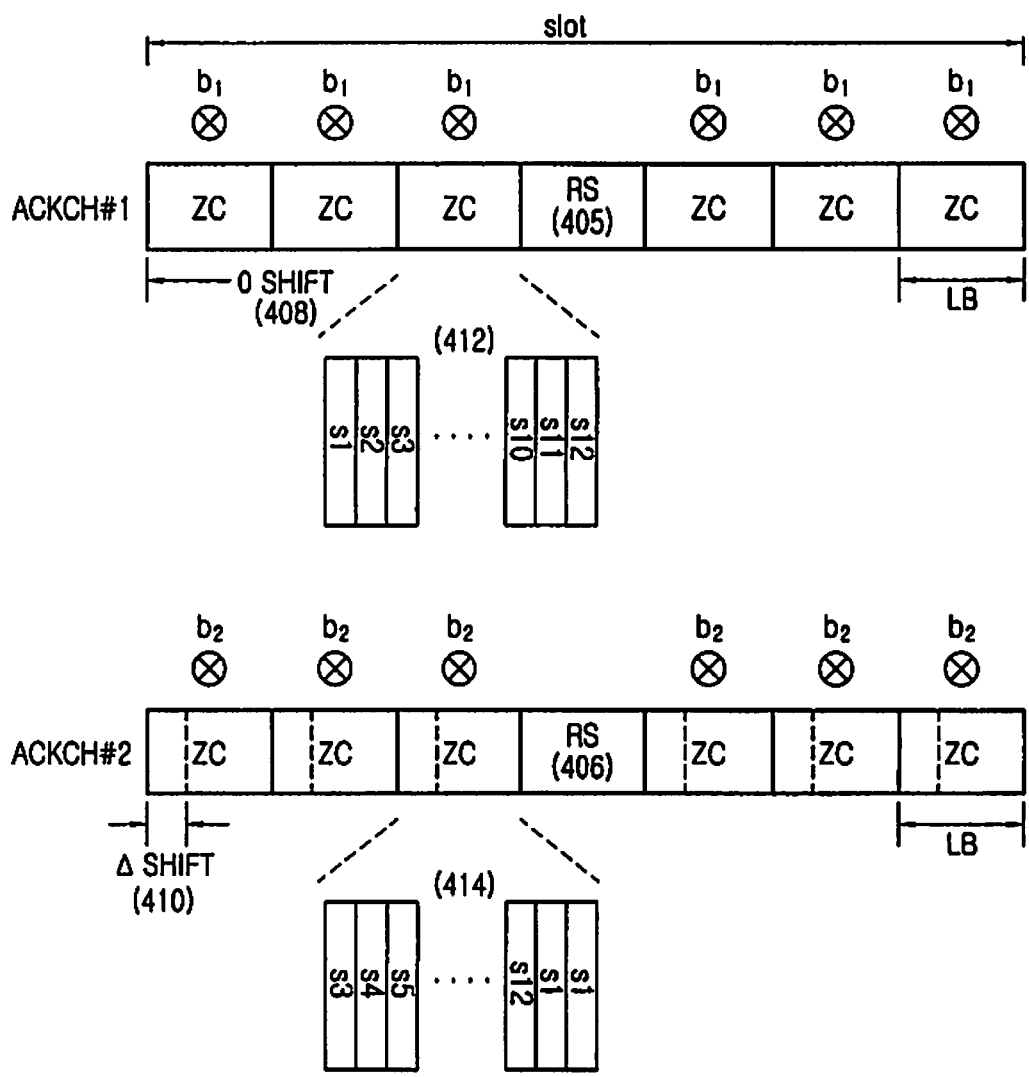
FIG. 4 illustrates the detailed CDM structure for control channels.
Figure 5:
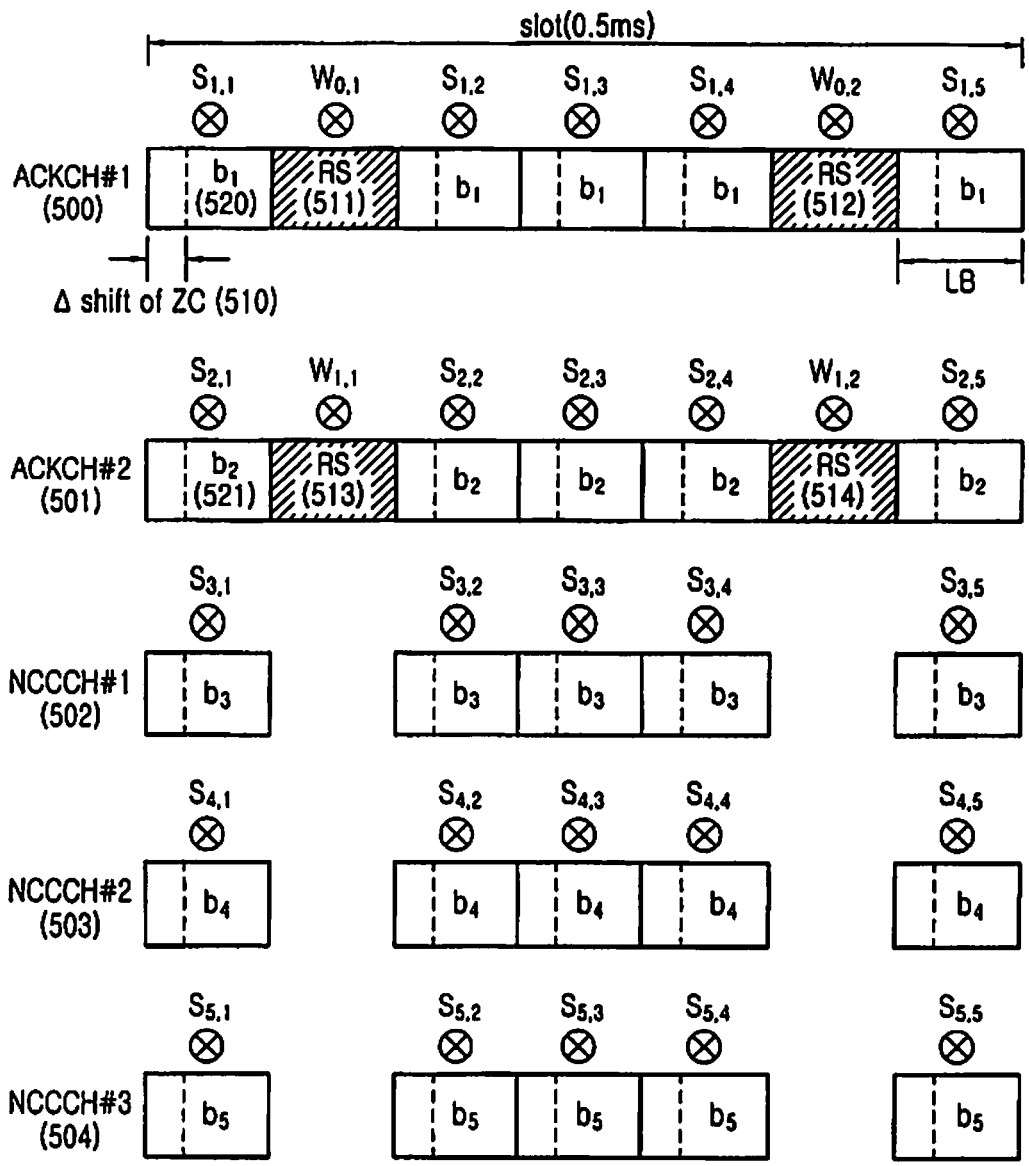
FIG. 5 illustrates a structure where five control channels are multiplexed in one RU for a 0.5-ms slot.

In step 906, the terminal applies a ZC sequence to the ACK/NACK symbol or RS symbol, as shown in FIG. 4, and then transmits the ACK/NACK symbol or RS symbol.

Figure 10:
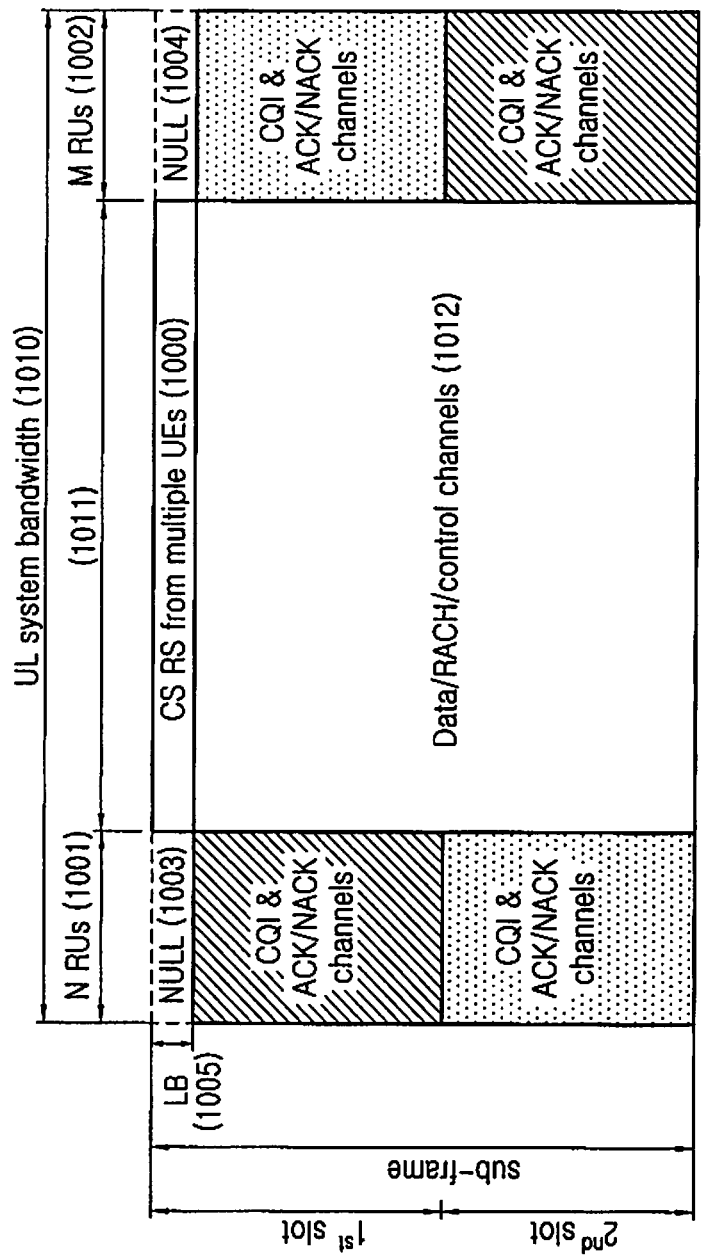
FIG. 10 illustrates multiplexing of a CS RS channel and other channels according to another embodiment of the present invention.

FIG. 10 illustrates multiplexing of a CS RS channel and other channels according to another preferred embodiment of the present invention.

Referring to FIG. 10, an uplink system band 1010 is composed of N first RUs 1001 and M second RUs 1002, all of which are used as control channel(s), and a central band 1011 between the first and second RUs 1001 and 1002. A data channel 1012 is mapped to the central band 1011. ACK/NACK symbols for an ACK/NACK symbols or CQI symbols for a CQI channel are transmitted in the control channel RUs 1001 and 1002.

A difference between the multiplexing structure shown in FIG. 10 and the multiplexing structure shown in FIG. 7 is in that a CS RS transmission band 1000 does not overlap with transmission bands 1001 and 1002 for an uplink control channel such as ACK/NACK channel and CQI channel. However, as in FIG. 7, in an LB 1005 where a CS RS is transmitted, the ACK/NACK symbol and the CQI symbol are not transmitted in the bands indicated by reference numerals 1003 and 1004. By transmitting the CS RS only in the band of a data channel in this way, it is possible to prevent the power loss which may occur as the CS RS is transmitted even in the band of the uplink control channel, i.e., it is possible to improve estimation accuracy of channel state information for scheduling the uplink data channel.

As is apparent from the foregoing description, the present invention can satisfy the single-carrier transmission characteristic required for SC-FDMA transmission even when one terminal must simultaneously transmit a CS RS channel and a control channel in one subframe. That is, the present invention allows the CS RS channel and the control channel to be independently transmitted in the SC-FDMA system, so that each terminal can always transmit each channel whenever needed while satisfying the single-carrier transmission characteristic. The base station receives the CS RS channel and control channels from each terminal at a predetermined time, thereby scheduling a data channel to each terminal both in the uplink and downlink at the right time, i.e., at the corresponding timing, and thus contributing to an improvement of the system performance.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting uplink control information by a terminal in an orthogonal frequency division multiplexing (OFDM) based communication system, the method comprising:
   receiving configuration information associated with an uplink transmission of a reference signal for channel sounding, from a base station; and
   transmitting the uplink control information including at least acknowledgement information to which a length-3 orthogonal sequence or a length-4 orthogonal sequence is applied based on a number of OFDM based symbols for transmission of the uplink control information, the number of OFDM based symbols being in one slot of a time domain;
   wherein the reference signal is transmitted based on the received configuration information.

2. The method of claim 1, wherein the length-3 orthogonal sequence and the length-4 orthogonal sequence are based on a fourier sequence.

3. The method of claim 1,
   wherein a bandwidth and a period for transmission of the reference signal for the channel sounding is configured by the base station.

4. A terminal for transmitting uplink control information in an orthogonal frequency division multiplexing (OFDM) based communication system, the terminal comprising:
   a transceiver; and
   a controller configured to:
      receive, via the transceiver, configuration information associated with an uplink transmission of a reference signal for channel sounding, from a base station, and
      transmit, via the transceiver, the uplink control information including at least acknowledgement information to which a length-3 orthogonal sequence or a length-4 orthogonal sequence is applied based on a number of OFDM based symbols for transmission of the uplink control information, the number of OFDM based symbols being in one slot of a time domain,
   wherein the reference signal is transmitted based on the received configuration information.

5. The terminal of claim 4, wherein the length-3 orthogonal sequence and the length-4 orthogonal sequence are based on a fourier sequence.

6. The terminal of claim 4, and
   wherein a bandwidth and a period for transmission of the reference signal for the channel sounding is configured by the base station.

7. A method for receiving uplink control information by a base station in an orthogonal frequency division multiplexing (OFDM) based communication system, the method comprising:
   transmitting, to a terminal, configuration information associated with an uplink transmission of a reference signal for channel sounding;
   receiving, from the terminal, the uplink control information including at least acknowledgement information to which a length-3 orthogonal sequence or a length-4 orthogonal sequence is applied based on a number of OFDM based symbols for transmission of the uplink control information, the number of OFDM based symbols being in one slot of a time domain; and receiving, from the terminal, the reference signal based on the configuration information.

8. The method of claim 7, wherein the length-3 orthogonal sequence and the length-4 orthogonal sequence are based on a fourier sequence.

9. The method of claim 7,
wherein a bandwidth and a period for transmission of the reference signal for the channel sounding is configured by the base station.

10. A base station for receiving uplink control information in an orthogonal frequency division multiplexing (OFDM) based communication system, the base station comprising:
a transceiver; and
a controller configured to:
transmit, via the transceiver, configuration information associated with an uplink transmission of a reference signal for channel sounding, to a terminal,
receive, via the transceiver, from the terminal, the uplink control information including at least acknowledgement information to which a length-3 orthogonal sequence or a length-4 orthogonal sequence is applied based on a number of OFDM based symbols for transmission of the uplink control information, the number of OFDM based symbols being in one slot of a time domain, and
receive, via the transceiver, the reference signal from the terminal based on the configuration information.

11. The base station of claim 10, wherein the length-3 orthogonal sequence and the length-4 orthogonal sequence are based on a fourier sequence.

12. The base station of claim 10,
wherein a bandwidth and a period for transmission of the reference signal for the channel sounding is configured by the base station.

\* \* \* \* \*